United States Patent [19]
Kubo et al.

[11] Patent Number: 4,510,293
[45] Date of Patent: Apr. 9, 1985

[54] PROCESS FOR HYDROGENATING CONJUGATED DIENE POLYMERS

[75] Inventors: Yoichiro Kubo; Takaaki Kohtaki, both of Yokohama; Kiyomori Oura, Kamakura, all of Japan

[73] Assignee: Nippon Zenn Co. Ltd., Tokyo, Japan

[21] Appl. No.: 561,033

[22] Filed: Dec. 13, 1983

[30] Foreign Application Priority Data

Dec. 23, 1982 [JP] Japan ................................ 57-225023

[51] Int. Cl.³ .............................................. C08F 8/04
[52] U.S. Cl. .................................. 525/338; 525/329.3; 525/332.8; 525/332.9; 525/333.1; 525/333.2; 525/339
[58] Field of Search ................................. 525/338, 339

[56] References Cited

U.S. PATENT DOCUMENTS

| 1,023,753 | 4/1912 | Paul | 502/226 |
| 2,178,523 | 10/1939 | Schmidt et al. | 525/338 |
| 3,432,518 | 3/1969 | Kallenbach | 525/338 |
| 3,951,933 | 4/1976 | Nasser, Jr. | 525/338 |
| 4,138,536 | 2/1979 | Hsieh | 525/338 |

Primary Examiner—J. Schofer
Assistant Examiner—Bernard Lipman
Attorney, Agent, or Firm—Sherman & Shalloway

[57] ABSTRACT

A process for catalytically hydrogenating a carbon-carbon double bond of a conjugated diene polymer by introducing hydrogen in the solution of said polymer, characterized in that a palladium salt of a carboxylic acid is used as a catalyst.

7 Claims, No Drawings

PROCESS FOR HYDROGENATING CONJUGATED DIENE POLYMERS

This invention relates to a process for hydrogenating a conjugated diene polymer. More specifically, it relates to a process for hydrogenating a conjugated diene polymer wherein a palladium salt of a carboxylic acid is used as a catalyst for hydrogenation of said polymer.

Reduction metal catalyst composed of carriers such as alumina and silica and deposited thereon metals of group VIII of the periodic table have been hitherto used to hydrogenate unsaturated polymers in solution. However, as the solutions of polymers have high viscosity, relatively large amounts of catalysts, high reaction temperatures above 150° C. and hydrogen held at a high pressure are needed to obtain a sufficient efficiency of hydrogenation using these heterogeneous catalysts. Such high temperatures tend to cleave the main chain of the polymer and permit occurrence of side reactions. Moreover, it has been very hard to remove catalysts from the resulting hydrogenated polymers.

A variety of homogeneous catalysts have been proposed to remedy these drawbacks. For example, there are an attempt that a diene polymer is produced with lithium hydrocarbyl as a polymerization catalyst and hydrogen is blown into the polymer solution continuously using said compound as a hydrogenation catalyst (Japanese Patent Publication No. 39274/70), an attempt that a reaction product of a metal hydrocarbyl compound with iron, cobalt or nickel is used as a catalyst (Japanese Patent Publication No. 25304/67), an attempt that an organic complex compound of nickel is added to a solution of a diene polymer resulting from polymerization using an organometallic compound composed of a metal such as lithium or aluminum as a polymerization catalyst to conduct hydrogenation (Japanese Patent Publication No. 5756/74), and a proposal wherein a nickel τ-complex is used as a catayst (Japanese Patent Publication No. 17130/71). However, in these methods, a catalytic substance is not only instable to air, water or impurities in the polymer and troublesome to treat, but also treatments conducted before hydrogenation, such as purification of polymers to undergo hydrogenation, removal of water from the polymer solutions, etc. have to be thoroughly carried out. These methods are therefore advantageous when a step of solution polymerization and a step of hydrogenation are performed continuously, but not suitable when a rubber containing various polymerization ingredients such as emulsifiers, modifiers, etc. using emulsion polymerization is hydrogenated in solution.

An object of this invention is to provide an industrially advantageous process for hydrogenating a conjugated diene polymer in solution by finding a homogeneous hydrogenating catalyst which is stable and easy to treat.

Amoung catalytic metals for hydrogenation, palladium has been so far employed in the hydrogenation of polymers as a metal which does not adversely affect hydrogenated polymers even if remaining therein. It has been used in the form of a heterogeneous catalyst deposited on a carrier such as an activated carbon or silica.

It is well known to hydrogenate low-molecular-weight organic compounds using palladium chloride as a palladium salt which is soluble or partly soluble in a solvent (e.g. U.S. Pat. No. 1,023,753). Even if polymers are however hydrogenated with palladium chloride, activity as a hydrogenation catalyst is low and only polymers having a low degree of hydrogenation result.

The present inventors have made efforts to develop soluble palladium salt catalysts and discovered that a palladium salt of a carboxylic acid is stable to air or water and has high activity as a catalyst for hydrogenation of conjugated diene-type polymers.

Thus, the present invention is to provide a process for catalytically hydrogenating a carbon-carbon double bond of a conjugated diene polymer by introducing hydrogen in the solution of the polymer, characterized in that a palladium salt of a carboxylic acid is used as a hydrogenation catalyst.

The palladium salt of the carboxylic acid is a hydrogenation catalyst which is stable to air or water without the need of a special expedient of storage, has excellent activity of hydrogenating polymers and is easy to treat.

Examples of the palladium salt of the carboxylic acid soluble or partly soluble in a solvent which is used in this invention include palladium salts of saturated aliphatic carboxylic acids such as formic acid, acetic acid, propionic acid, lactic acid, caprylic acid, lauric acid, palmitic acid, stearic acid, oxalic acid, malonic acid, succinic acid, adipic acid, pimeric acid, sebacic acid, glycolic acid, lactic acid, methoxyacetic acid, glyoxylic acid and citric acid; palladium salts of unsaturated aliphatic carboxylic acids such as acrylic acid, vinyl acetate, butenoic acid, crotonic acid, methacrylic acid, pentenoic acid, octenoic acid, oleic acid, octadecenoic acid, linolic acid, linoleic acid and propiolic acid; and palladium salts of aromatic carboxylic acids such as benzoic acid, toluic acid, ethylbenzoic acid, trimethylbenzoic acid, phenylacetic acid, phthalic acid, isophthalic acid, terephthalic acid and naphthoic acid. However, these palladium salts of carboxylic acids are not critical.

The amount of the palladium salt of the carboxylic acid may be properly determined depending on a type of a polymer to be hydrogenated and an intended hydrogenation degree. However, viewed from the influence on properties of the polymer after reaction and the cost, the amount thereof calculated as palladium is usually not more than 2000 ppm, preferably not more than 1500 ppm based on the polymer.

The conjugated diene polymer used in this invention is produced from 10 to 100% by weight of at least one conjugated diene monomer and 90 to 0% by weight of at least one ethylenically unsaturated monomer through means such as solution polymerization, emulsion polymerization, etc. Examples of the conjugated diene monomer include 1,3-butadiene, 2,3-dimethylbutadiene, isoprene and 1,3-pentadiene. Examples of the ethylenically unsaturated monomer include unsaturated nitriles such as acrylonitrile and methacrylonitrile, monovinylidene aromatic hydrocarbons such as styrene and alkylstyrene, unsaturated carboxylic acids such as acrylic acid, methacrylic acid, crotonic acid, itaconic acid and maleic acid, unsaturated carboxylic acid esters such as methyl acrylate, ethyl acrylate, butyl acrylate, 2-ethylhexyl acrylate and methyl methacrylate, vinylpyridine and vinyl esters such as vinyl acetate. Of these, the typical conjugated diene polymers are polybutadiene, polyisoprene, a butadiene-styrene(random or block) copolymer and an acrylonitrile-butadiene (random or alternating)polymer.

The catalysts of this invention are most suitable for hydrogenation of the acrylonitrile-butadiene copolymer and ensures a high hydrogenation degree of a carbon-carbon double bond without reducing a nitrile group.

When using the polymer obtained by solution polymerization, the hydrogenation reaction is conducted with the polymer solution as such. When using the solid polymer, the hydrogenation reaction is conducted with said polymer in the form of a solution of it in a solvent. The concentration of the polymer solution is 1 to 70% by weight, preferably 1 to 40% by weight.

A solvent that dissolves a catalyst and a polymer is desirous, but a solvent containing a portion partly insoluble in a catalyst may be also used. The solvent is selected depending on a type of a carboxylic acid palladium salt and a type of a polymer. Examples of the solvent include benzene, toluene, xylene, hexane, cyclohexane, cyclohexanone, acetone, methyl ethyl ketone, diethyl ketone, tetrahydrofuran and ethyl acetate.

A method of a hydrogenation reaction include two embodiments. One of them comprises previously adding a palladium salt of a carboxylic acid to an inert solvent, reducing it with hydrogen and introducing a given amount of the resulting solution into a polymer solution to conduct the hydrogenation reaction. Another comprises directly adding a palladium salt of a carboxylic acid to a polymer solution, reducing it in the presence of a polymer and then conducting the hydrogenation reaction. The latter method is higher in reaction activity and easier in operation than the former.

The reduction temperature of the catalyst is 5° to 100° C., preferably 10° to 90° C.

The temperature of the hydrogenation reaction is 0° to 300° C., preferably 20° to 150° C. When the temperature is higher than 150° C., a side reaction occurs which is undesious from the aspect of the selective hydrogenation. For example, the solvent is hydrogenated or an ethylenically unsaturated monomer unit in the polymer (e.g. a nitrile group of acrylonitrile or a benzene nueucleus of styrene) is hydrogenated.

The hydrogen pressure is in the range of atmospheric pressure to 300 kg/cm$^2$, preferably 5 to 200 kg/cm$^2$. A high pressure above 300 kg/cm$^2$ is also available, but it gives rise to increase in factors of hindering practical applications, such that a cost of equipment is raised and treatment becomes troublesome.

When the hydrogenation reaction is terminated, an ion exchange resin is added to a reaction solution to adsorb a catalyst, after which the catalyst is removed from the reaction solution by a customary means of removing the catalyst, such as centrifugal separation and filtration. The catalyst can also remain as such in the hydrogenated polymer without removal.

The hydrogenated polymer may be separated from the reaction solution by a usual method employed to recover a polymer from a polymer solution. Examples thereof are a steam coagulation method wherein a polymer solution is brought into direct contact with a steam, a drum drying method wherein a polymer solution is dropped onto a heated rotating drum to evaporate a solvent, and a method wherein a poor solvent is added to a polymer solution to precipitate the polymer. The hydrogenated polymer is recovered as a solid product by separating said polymer from the solution through such separation means, removing water and drying the resulting polymer by a procedure such as hot-air drying, vacuum drying or extrusion drying.

The resulting hydrogenated conjugated diene polymer having excellent weatherability, ozone resistance, heat resistance and cold resistance can be used in the wide-ranging applications.

The following Examples illustrate this invention specifically. However, this invention is not limited to these Examples.

A hydrogenation degree of a carbon-carbon double bond was measured according to an iodine value method.

COMPARATIVE EXAMPLE 1

Palladium chloride as a catalyst was dissolved in acetone to form a 0.1% by weight solution. An autoclave having a capacity of 100 ml was charged with a solution obtained by dissolving in 42.5 g of acetone 7.5 g of an acrylonitrile-butadiene copolymer ("NBR" for short: an amount of bonded acrylonitrile 39.4% by weight, $ML_{1+4\ 100°\ C.}=50$), and 7.8 ml of the above catalyst solution ($5\times10^{-4}$ part by weight of Pd per part by weight of the polymer). The inside of the system was purged with nitrogen and a hydrogen pressure of 50 kg/cm$^2$ was exerted for 30 minutes while maintaining the temperature at 20° C., to thereby reduce the catalyst. After reduction, the autoclave was dipped in a hot bath held at 50° C. to hydrogenate the polymer for 5 hours. The results of the reaction are shown in Table 1.

The above procedure was followed in the same sequence for polybutadiene ("BR" for short: a cis-1,4 content 98%, $ML_{1+4,\ 100°\ C.}=40$), polyisoprene ("IR" for short; $ML_{1+4,\ 100°\ C.}=80$) and a styrene-butadiene copolymer ("SBR" for short: a styrene content 23.5% by weight, $ML_{1+4,\ 100°\ C.}=50$) except using benzene as a solvent. The results are shown in Table 1.

EXAMPLE 1

The hydrogenation reaction was conducted for NBR, BR, IR and SBR as in Comparative Example 1 using palladium acetate as a catalyst.

A 0.5% by weight acetone solution of palladium acetate and a 0.5% by weight benzene solution of palladium acetate were prepared respectively. NBR was dissolved in acetone and the other polymers in benzene (the concentration each of the polymers in the solution was the same as in Comparative Example 1).

The acetone solution or benzene solution of the catalyst was charged in a 100-milliliter autoclave so that the amount of Pd became $5\times10^{-4}$ part by weight per part by weight of the polymer. After the inside of the system was purged with nitrogen, the temperature was held at 20° C. and a hydrogen pressure of 50 kg/cm$^2$ was exerted for 30 minutes to reduce the catalyst. After reduction, a polymer solution purged with nitrogen was charged into the autoclave, and a hydrogen pressure of 50 kg/cm$^2$ was applied at 50° C. for 5 hours to hydrogenate the polymer. The results of the reaction are shown in Table 1.

EXAMPLE 2

The procedure of Example 1 was repeated except using palladium benzoate as a catalyst. The results are shown in Table 1.

EXAMPLE 3

NBR (same as in Comparative Example 1) was hydrogenated using palladium acetate as a catalyst.

A 100-milliliter autoclave was charged with a solution of 7.5 g of NBR in 42.5 g of acetone and 2.0 ml of a 0.5% by weight acetone solution of palladium acetate (Pd was $5\times10^{-4}$ part by weight per part by weight of the polymer). After the inside of the system was purged with nitrogen, the temperature was maintained at 20° C. and a hydrogen pressure of 50 kg/cm$^2$ was exerted for 30 minutes to reduce the catalyst. After reduction of the catalyst, the temperature of the autoclave was kept at 50° C. and the polymer was hydrogenated at a hydrogen pressure of 50 kg/cm$^2$ for 3 hours.

BR, IR and SBR (which were the same as used in Comparative Example 1) were hydrogenated in the same way as above except using benzene as a solvent. The results are shown in Table 1.

EXAMPLE 4

NMR, BR, IR and SBR were hydrogenated in the same way as in Example 3 except using palladium propionate as a catalyst. The results are shown in Table 1.

EXAMPLE 5

NBR, BR, IR and SBR were hydrogenated in the same way as in Example 3 except that palladium benzoate was used as a catalyst and the reaction time was 5 hours. The results are shown in Table 1.

EXAMPLE 6

NBR, BR, IR and SBR were hydrogenated using palladium tartrate as a catalyst. The reaction conditions were the same as those in Example 3 except that the amount of the catalyst calculated as palladium was $6 \times 10^{-4}$ part by weight per part by weight of the polymer and the reaction time was 5 hours. The results are shown in Table 1.

EXAMPLE 7

NBR was hydrogenated using as a catalyst palladium stearate, palladium oleate, palladium succinate or palladium phthalate. The reaction conditions were the same as those in Example 3 except that the reaction time in the case of using each of the latter three catalysts was 5 hours. The results are shown in Table 2.

TABLE 2

|  | Palladium stearate | Palladium oleate | Palladium succinate | Palladium phthalate |
|---|---|---|---|---|
| Reaction time (hr) | 3 | 5 | 5 | 5 |
| Hydrogenation degree (%) | 54.0 | 74.3 | 58.6 | 54.3 |

What is claimed is:

1. In a process for catalytically hydrogenating a carbon-carbon double bond of a conjugated diene polymer by introducing hydrogen in the solution of said polymer, the improvement wherein a palladium salt of the hydrogenation carboxylic acid is used as the essential hydrogenation catalyst.

2. The process of claim 1 wherein the palladium salt of the carboxylic acid is reduced with hydrogen in the solution of the conjugated diene polymer and then said polymer is hydrogenated in the solution.

3. The process of claim 1 or 2 wherein the palladium salt of the carboxylic acid is a palladium salt of a carboxylic acid selected from a saturated aliphatic carboxylic acid, an unsaturated aliphatic carboxylic acid and an aromatic carboxylic acid.

4. The process of claim 1 wherein the conjugated diene polymer is produced from 10 to 100% by weight of at least one conjugated diene monomer and 90 to 0% by weight of at least one ethylenically unsaturated monomer.

5. The process of claim 4 wherein the conjugated diene monomer is selected from the group consisting of 1,3-butadiene, 2,3-dimethylbutadiene, isoprene and 1,3-pentadiene; and the ethylenically unsaturated monomer is selected from the group consisting of acrylonitrile, methacrylonitrile, styrene, alkyl styrene, acrylic acid, methacrylic acid, crotonic acid, maleic acid, methyl acrylate, ethyl acrylate, butyl acrylate, 2-ethylhexyl acrylate, methyl methacrylate, vinylpyridine and vinyl acetate.

6. The process of claim 1 wherein the conjugated diene polymer is selected from the group consisting of polybutadiene, polyisoprene, butadiene-styrene copolymer, and acrylonitrile-butadiene copolymer.

7. The process of claim 1 wherein the conjugated diene polymer is an acrylonitrile-butadiene copolymer.

TABLE 1

| Catalyst | | Comparative Example 1 Palladium chloride | Example 1 Palladium acetate | Example 2 Palladium benzoate | Example 3 Palladium acetate | Example 4 Palladium propionate | Example 5 Palladium benzoate | Example 6 Palladium tartrate |
|---|---|---|---|---|---|---|---|---|
| Catalyst reduction conditions: | | | | | | | | |
| Hydrogen pressure: | 50 kg/cm$^2$ | in the presence of a polymer | in the absence of a polymer | in the absence of a polymer | in the presence of a polymer | in the presence of a polymer | in the presence of a polymer | in the presence of a polymer |
| Temperature: | 20° C. | | | | | | | |
| Time: | 30 minutes | | | | | | | |
| Hydrogenation conditions | Pressure (kg/cm$^2$) | 50 | 50 | 50 | 50 | 50 | 50 | 50 |
| | Temperature (°C.) | 50 | 50 | 50 | 50 | 50 | 50 | 50 |
| | Time (hrs.) | 5 | 5 | 5 | 3 | 3 | 5 | 5 |
| Hydrogenation degree (%) | NBR | 15.5 | 32.3 | 27.1 | 97.2 | 93.5 | 80.3 | 94.7 |
| | BR | 13.3 | 28.5 | 25.7 | 66.5 | 68.0 | 76.5 | 88.3 |
| | IR | 12.1 | 25.3 | 20.5 | 40.0 | 45.2 | 50.5 | 73.0 |
| | SBR | 19.3 | 30.0 | 25.1 | 72.3 | 75.1 | 82.3 | 90.7 |

* * * * *

UNITED STATES PATENT AND TRADEMARK OFFICE
CERTIFICATE OF CORRECTION

PATENT NO. : 4,510,293
DATED : April 9, 1985
INVENTOR(S) : YOICHIRO KUBO, ET AL.

It is certified that error appears in the above-identified patent and that said Letters Patent is hereby corrected as shown below:

On the title page;

Assignee: Please delete "Nippon Zenn Co. Ltd", insert --Nippon Zeon Co. Ltd.--

Claim 1, lines 4-5, delete "the hydrogenation carboxylic", insert --a carboxylic--.

Signed and Sealed this

Thirtieth Day of July 1985

[SEAL]

Attest:

DONALD J. QUIGG

Attesting Officer

Acting Commissioner of Patents and Trademarks